United States Patent
Soh

(10) Patent No.: US 8,139,172 B2
(45) Date of Patent: Mar. 20, 2012

(54) 3-DIMENSIONAL DISPLAY DEVICE USING LIGHT CONTROLLING FILM

(75) Inventor: Jae-Hyun Soh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 547 days.

(21) Appl. No.: 11/819,957

(22) Filed: Jun. 29, 2007

(65) Prior Publication Data

US 2008/0013003 A1  Jan. 17, 2008

(30) Foreign Application Priority Data

Jun. 29, 2006 (KR) .................. 10-2006-0059989

(51) Int. Cl.
*G02F 1/1335* (2006.01)

(52) U.S. Cl. .................................. 349/15; 349/112

(58) Field of Classification Search .............. 349/15, 349/13, 112; 359/462; 438/30; 353/7
See application file for complete search history.

(56) References Cited

U.S. PATENT DOCUMENTS

| | | | | |
|---|---|---|---|---|
| 5,315,377 A * | 5/1994 | Isono et al. | ...................... | 348/51 |
| 5,798,866 A * | 8/1998 | De Vaan | ......................... | 359/621 |
| 5,831,765 A * | 11/1998 | Nakayama et al. | ............ | 359/464 |
| 6,137,456 A * | 10/2000 | Bhagavatula et al. | ............. | 345/7 |
| 7,385,653 B2 * | 6/2008 | Kim et al. | ......................... | 349/61 |
| 7,471,346 B2 * | 12/2008 | Tanaka et al. | .................... | 349/15 |
| 2001/0015780 A1 * | 8/2001 | Yamaguchi | ..................... | 349/112 |
| 2002/0113753 A1 * | 8/2002 | Sullivan et al. | .................... | 345/6 |
| 2003/0039031 A1 * | 2/2003 | Redert | ........................... | 359/463 |
| 2004/0130503 A1 * | 7/2004 | Hamagishi et al. | ................ | 345/6 |
| 2004/0246696 A1 * | 12/2004 | Yoo | .................................. | 362/27 |
| 2005/0057702 A1 * | 3/2005 | Cho et al. | ......................... | 349/15 |
| 2005/0134762 A1 * | 6/2005 | Sung et al. | ........................ | 349/96 |
| 2005/0157223 A1 * | 7/2005 | Sung et al. | ........................ | 349/69 |
| 2005/0168401 A1 * | 8/2005 | Lee et al. | ........................... | 345/7 |
| 2005/0206832 A1 * | 9/2005 | Tahara et al. | ................... | 349/182 |
| 2006/0139448 A1 * | 6/2006 | Ha et al. | ........................... | 348/51 |
| 2006/0164578 A1 * | 7/2006 | Matsumoto et al. | ........... | 349/117 |
| 2006/0176557 A1 * | 8/2006 | Travis et al. | .................... | 359/462 |
| 2006/0250550 A1 * | 11/2006 | Tanaka et al. | ................. | 349/114 |
| 2007/0019291 A1 * | 1/2007 | Nam et al. | ...................... | 359/464 |
| 2008/0063808 A1 * | 3/2008 | Stumpe et al. | ................ | 427/510 |

* cited by examiner

*Primary Examiner* — Brian M. Healy
*Assistant Examiner* — Peter Radkowski
(74) *Attorney, Agent, or Firm* — McKenna Long & Aldridge, LLP

(57) ABSTRACT

A 3-dimensional display device includes a display panel for displaying image; a backlight for supplying light to the display panel; a light scattering control unit between the display panel and the backlight to scatter or transmit the light from the backlight; and a light control film over the backlight to reflect and focus the light from the backlight.

21 Claims, 3 Drawing Sheets

3-DIMENSIONAL DISPLAY DEVICE USING LIGHT CONTROLLING FILM

This application claims the benefit of Korean Patent Application No. 10-2006-59989, filed on Jun. 29, 2006, which is hereby incorporated by reference for all purposes as if fully set forth herein.

BACKGROUND OF THE INVENTION

1. Field of the Invention

The present invention relates to a 3-dimensional display device, and more particular to a 3-dimensional display device having improved photo-efficiency and brightness.

2. Discussion of the Related Art

Due to the high speed telecommunication network, telecommunication equipment has been developed to a digital terminal which is used for a multi-media service such as text message service, voice service, and image service as well as telephone. This telecommunication equipment may be developed to the 3-dimensional (dimensional) real telecommunication service.

A 3-dimensional image is realized by the principle of stereo-sight in two eyes. Since the two eyes of a human are apart from each other at 65 mm, the binocular parallax is most important thing in the 3-dimensional image. When the left eye and the right eye see respectively different 2-dimensional images, each 2-dimensional is transmitted to the brain through a retina, and the brain combines the two 2-dimensional images to recognize the 3-dimensional image.

This function is called as stereography. There some methods for 3-dimensional image using the 2-dimensional, for example, the 3-dimensional image method using an anaglyphoscope, the 3-dimensional image method without anaglyphoscope, and a holographic method.

Of these methods, there are some problems in the 3-dimensional image method using an anaglyphoscope and the holographic method. That is, in the 3-dimensional image method using an anaglyphoscope, for a many people to see the 3-dimensional image at the same time, they must put on the anaglyphoscope glasses. In the holographic method, although users may see the 3-dimensional image at all the directions, there are some technical problems and the space required for holographic system may be increased.

There are not these problems in the 3-dimensional image method without anaglyphoscope and thus this method has been adapted to the 3-dimensional display device. Specially, the parallax 3-dimensional image method that the stereo images for the right eye and the left eye are separated to see the 3-dimensional image is mainly used.

In the parallax method, the image having image information for the right and left eyes is superposed with the slits arranged in the horizontal direction is superposed to separate the composed 3-dimensional image into the right image and the left image. By this separation, the user is able to see the 3-dimensional image. In this method, the display device should include the display panel for display image and a parallax barrier having slits.

Hereinafter, we will describe the related parallax 3-dimensional display device accompanying FIG. 1. At that time, the liquid crystal display panel is described as the main display panel.

As shown in FIG. 1, the liquid crystal display panel 10 includes a plurality of left eye pixels L and right eye pixels R arranged alternatively each other. A backlight 20 is disposed in the rear of the liquid crystal display panel 10 to supply the light to the liquid crystal display panel 10. The parallax barrier 30 is disposed between the liquid crystal display panel 10 and the viewer 40 to transmit or block the light transmitting the liquid crystal display panel 10. In the parallax barrier 30, a plurality of slits 32 and barriers 34 are alternatively formed in the stripe shape to transmit and block respectively the light from the left eye pixels L and the right eye pixels R.

In the related display device, the light L1 transmitting the left eye pixels L of the liquid crystal display panel 10 from the backlight 20 is reached to the left eye of the viewer 40 through the slits 32 of the parallax barrier 30, while the light L2 transmitting the left eye pixels L of the liquid crystal display panel 10 and to be reached to the right eye of the viewer 40 is blocked by the barrier 34 of the parallax barrier 30.

Further, the light R1 transmitting the right eye pixels R of the liquid crystal display panel 10 from the backlight 20 is reached to the right eye of the viewer 40 through the slits 32 of the parallax barrier 30, while the light R2 transmitting the right eye pixels R of the liquid crystal display panel 10 and to be reached to the left eye of the viewer 40 is blocked by the barrier 34 of the parallax barrier 30.

Accordingly, the light L1 and R2 transmitting the left eye pixels L and the right eye pixels R is respectively reached to only the left eye and the right eye of the viewer 40. Since there is the sufficient parallax information between the light L1 and R2 transmitting the left eye pixels L and the right eye pixels R, the viewer 40 can perceive the parallax between the light L1 and R2 transmitting the left eye pixels L and the right eye pixels R and thus see the 3-dimensional images.

In the related parallax 3-dimensional display device, however, since the light is passing only the slit 32 of the parallax barrier 30 and blocked in other region by the barrier 34, the transmittance may be decreased and the brightness may be also decreased.

Further, since only a 3-dimensional image can be displayed in the related parallax 3-dimensional display device, it is impossible to watch the 2-dimensional image with this device. Actually, the present images are mainly displayed by the 2-dimensional display device. Thus, if only a 3-dimensional image can be displayed by the 3-dimensional display device, the user has to buy an additional display device to watch the 2-dimensional image.

SUMMARY OF THE INVENTION

An object of the present invention is to provide a 3-dimensional display device having a light scattering control unit and a switching liquid crystal panel to display both 2 and 3-dimensional images.

Another object of the present invention is to provide the 3-dimensional display device having good brightness by focusing the light from a backlight to improve the efficient of the light.

In order to achieve the object, the 3-dimensional display device according to the present invention includes a display panel for displaying image; a backlight for supplying light to the display panel; a light scattering control unit between the display panel and the backlight to scatter or transmit the light from the backlight; and a light control film over the backlight to reflect and focus the light from the backlight.

The display panel includes a liquid crystal display panel having a plurality of left eye pixels and right eye pixels to be alternatively disposed each other. The light scattering control unit includes a polymer dispersed liquid crystal layer between the substrates and electrodes for applying the voltage to the polymer dispersed liquid crystal layer.

The light control film includes a substrate, a reflecting layer on the substrate to reflect the light incident from the backlight into the backlight, and lens on the substrate to focus the light.

Further, the present 3-dimensional display device further includes a switching liquid crystal panel for transmitting and blocking the light incident to the display panel in a part area. The switching liquid crystal panel includes first and second substrate, a liquid crystal layer between the first and second substrate, and first electrode on a part of the first substrate and a second electrode on the second substrate to apply the voltage to the liquid crystal layer.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be given in detail to an embodiment of the present invention, examples of which are illustrated in the accompanying drawings.

The embodiment provides the 3-dimensional display device having good brightness. The 3-dimensional display device is a parallax type display device. The parallax barrier may be in the rear side of the display panel. In case where the parallax barrier having the slits and the barriers is disposed in the rear side of the display panel, as the related art, the light transmitting the left eye pixels of the liquid crystal display panel from the backlight is reached to only the left eye of the viewer through the slits of the parallax barrier, and the light transmitting the right eye pixels of the liquid crystal display panel from the backlight is reached to only the right eye of the viewer through the slits of the parallax barrier, so that the viewer can see the 3-dimensional images.

In this embodiment, the parallax barrier is formed with liquid crystal layer between two substrates with electrodes, so that the 2-dimensional image can be displayed by not applying the voltage state to the electrodes and the 3-dimensional image can be displayed by blocking the light through the region corresponding to the electrodes by applying the voltage to the electrodes.

In addition, in this embodiment, the 3-dimensional display device includes a light control film to improve the efficiency of the light.

Hereinafter, the 3-dimensional display device according to the embodiment will be described in detail accompanying drawings. In the description, we will describe the liquid crystal display panel as a display panel. However, various display panels may be substituted.

Figure 1:
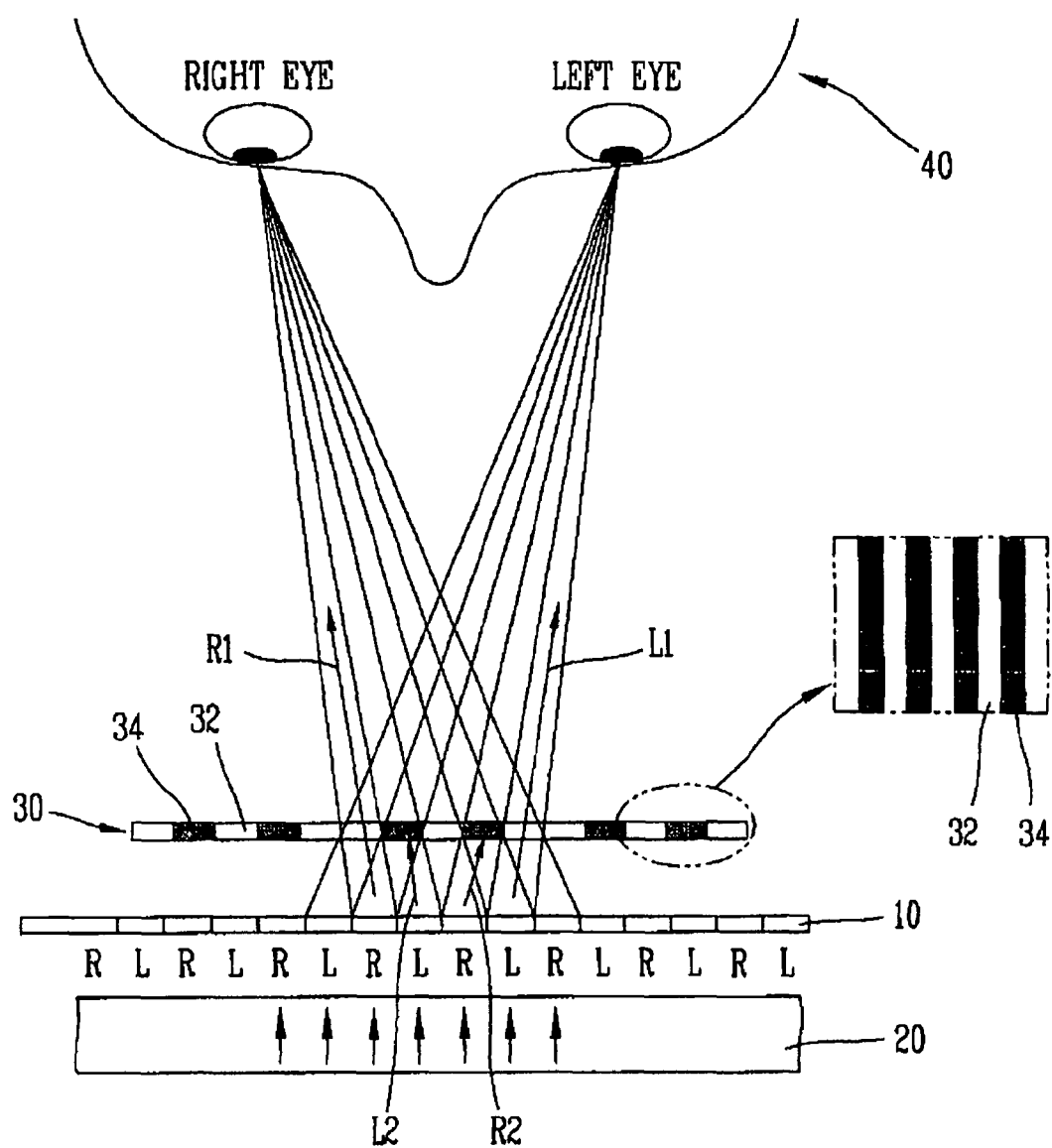
FIG. 1 is a view showing related parallax 3-dimensional display device.
Figure 2A:
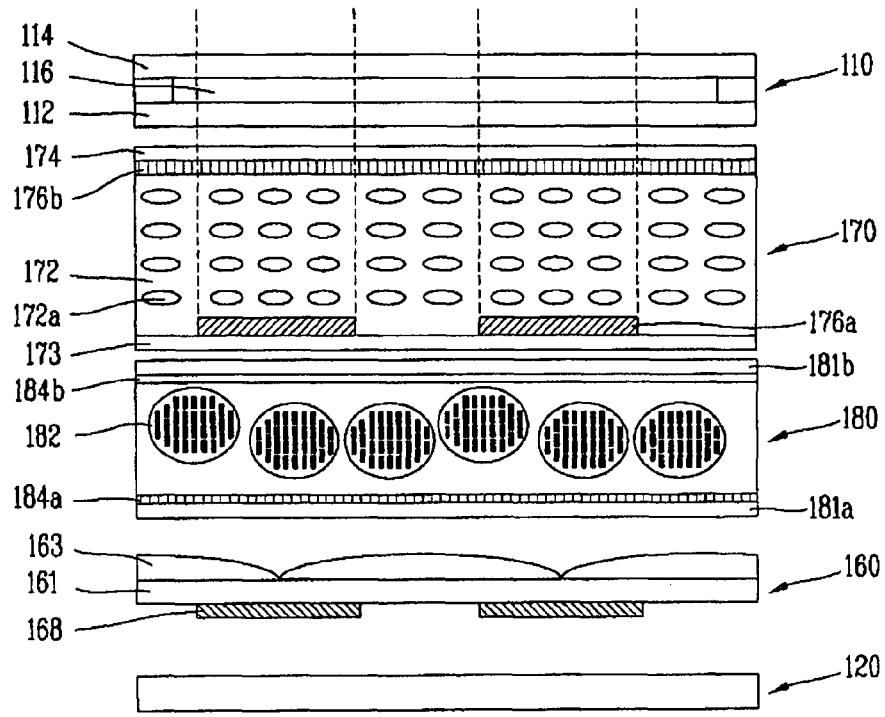
FIGS. 2A and 2B are views showing a 3-dimensional display device according to one embodiment of the present invention.
Figure 2B:
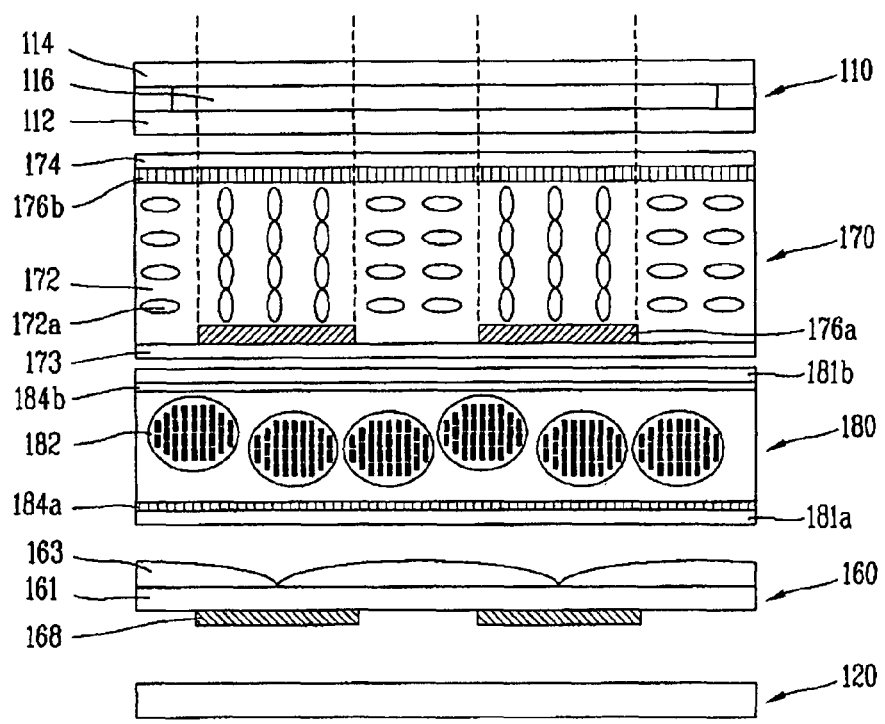

FIGS. 2A and 2B are views indicating the 3-dimensional display device according to an embodiment of this invention.

As shown in FIGS. 2A and 2B, the 3-dimensional display device includes a liquid crystal display panel 110, a backlight 120 for supplying the light to the liquid crystal display panel 110, a switching liquid crystal panel 170 for transmitting or blocking the light from the backlight 120 to function as a parallax barrier, a light scattering control unit 180 in the rear side of the switching liquid crystal panel 170 to control the scattering of the light incident into the switching liquid crystal panel 170, and a light control film 160 between the light scattering control unit 180 and the backlight 120 to reflect and focus the light incident to the light scattering control unit 180 in order to improve the efficiency of the light.

Not shown in figures, a plurality of left eye pixels for displaying the image information for the left eye and right eye pixels for displaying the image information for the right eye may be alternately arranged. At this time, the left eye pixels and the right eye pixels are defined by a plurality of gate lines and data lines on a first substrate 112 which are disposed in the perpendicular direction each other to apply respectively the scan signal and the image signal to the left eye pixels and the right eye pixels. In each left eye pixels and the right eye pixels, further, a thin film transistor is disposed. The thin film transistor is turned on when the scan signal is applied through the gate line, so that the image signals for the left eye and the right eye are respectively supplied to the left eye pixels and the right eye pixels to display the images for the left eye and the right eye.

A black matrix (not shown) for blocking the light transmitting through the non-displaying region and a color filter (not shown) for representing the colors may be formed on a second substrate 114, and a liquid crystal layer 116 may be formed between the first and second substrates.

Not shown in figure, the backlight 120 may include at least one lamp for emitting the light, an optical sheet for improving the efficiency of the light, and a reflecting plate for reflecting the light to the liquid crystal display panel 110.

Further, the switching liquid crystal panel 170 may include substrates 173 and 174, a liquid crystal layer 172 between the substrates 173 and 174, a first electrode 176a in the predetermined region on the lower substrate 173, and a second substrate 176b in the whole area of the upper substrate 174.

The first and second electrodes 176a and 176b may be made of a transparent conductive material such as an indium tin oxide and an indium zinc oxide. When the voltage is applied to the first and second electrodes 176a and 176b, the electric field is applied between the first and second electrode 176a and 176b to arrange the liquid crystal molecules 172a of the liquid crystal layer 172 along the direction of the electric field in the region corresponding to the first electrode 176a.

The light scattering control unit 180 may include substrates 181a and 181b, electrodes 184a and 184b on the substrates 181a and 18b, and a polymer dispersed liquid crystal layer 182 between the substrates 181a and 181b. The polymer dispersed liquid crystal layer 182 includes a plurality of liquid crystal molecules having length of several mm dispersed in the polymer or liquid crystal molecules in the polymer of net shape. In the light scattering control unit 180, when the voltage is not applied to the electrodes 184a and 184b, the arrange directions of the liquid crystal molecules are random so that the light is scattered at the boundary with the material having different refraction ratio from the liquid crystal molecules. When the voltage is applied to the electrodes 184a and 184b, the liquid crystal molecules are arranged in the uniform direction so that the light is passing through the scattering region unscattered regions and through the switching region where the electric field is not formed.

In the 3-dimensional display device having the light scattering control unit 180, the light from the backlight 120 may be controlled to scatter or pass the light scattering control unit 180 by applying or not the voltage to the electrodes 184a and 184b.

The light control film 160 includes the transparent substrate 161, a lens 163 for focusing the light to be incident from the backlight 120 on the upper surface of the substrate 161, and a reflecting layer 168 on the lower surface of the substrate 161 for reflecting from the light scattering control unit 180.

Although only the convex lens is introduced in the figure, the various lenses may be used for the light control film 160. The reflecting layer 168 may be formed with the metal having good reflectivity such as Al or Al alloy. When the light is incident to the light control film 160 from the backlight 120, a part of the light transmits the transmitting region of the reflecting layer 168 and then incident to the light scattering control unit 180. Further, the light incident to the reflecting layer 168 is reflected by the reflecting layer 168 and re-reflected by the reflecting plate (not shown) of the backlight 120. The re-reflected light is focused by the lens 164 and then incident to the light scattering control unit 180.

The operation of the 3-dimensional display device according this embodiment will describe in detail as follow.

In case where the voltage is not applied to the light scattering control unit 180, in the 2-dimensional display mode, the light is scattered at boundary between the polymer and the liquid crystal molecules arranged randomly in the polymer when the light is incident to the light scattering control unit 180 through the transmitting region of the light control film 160 from the backlight 120. By this scattering, the light transmitting the light scattering control unit 180 is uniformly inputted to the switching liquid crystal panel 170.

At this time 2-dimensional display mode, the signal, that is, the voltage is not applied to the first and second electrodes 176a and 176b so that the liquid crystal molecules 172a are arranged in the same direction in the whole area of the liquid crystal layer 172. Thus, the light is uniformly transmitted in the whole area of the switching liquid crystal panel 170 and then incident to the liquid crystal display panel 110. As a result, the light transmitting the left and right eye pixels reaches to both the left and right eyes of the reviewer to perceive the 2-dimensional image.

The reflecting layer 168 of the light control film 160 reflects the light to be incident thereto. The light reflected from the reflecting layer 168 is re-reflected by the reflecting plate (not shown) of the backlight 120 and then incident to the light control film 160. A part of the incident light to the light control unit 160 is re-incident to the light scattering control unit 180 through the transmitting region of the light control film 160. The remainder light of the incident light to the light control unit 160 is re-reflected from the reflecting layer 168 and then re-reflected from the reflecting plate of the backlight 120 to incident to the light scattering control unit 180 through the transmitting region of the light control film 160. In other word, the light to be incident to the reflecting layer 168 is incident to liquid crystal display panel 110 through the transmitting region of the light control film 160 by the reflecting mechanism.

In the transmitting region of the light control film 160, the lens 163 is disposed. Thus, the light is refracted and focused by the lens 163 and then transmitting the transmitting region of the light control film 160 so that an amount of the light incident to the front side of the light scattering control unit 180 and as a result the brightness can be improved.

In 3-dimensional display mode, the voltage is applied to the first electrode 176a and the second electrode 176b. By applying the voltage to the electrodes 176a and 176b, the electric field is formed in the liquid crystal layer 172 of the switching liquid crystal panel 170 to arrange the liquid crystal molecules 172 along the electric field. At that time, since the electric field is formed at only the region corresponding to the first electrode 176a in the liquid crystal layer 172, the liquid crystal molecules 172a in the region corresponding to the first electrode 176a are arranged along the electric field and the liquid crystal molecules in other region maintains in the original arrangement.

As described above, in this embodiment, when the light from the light scattering control unit 180 is inputted to the switching liquid crystal panel 170 to which the voltage is applied, the liquid crystal molecules 172a are arrange in the direction perpendicular to the surface of the substrate 173 and 174 along the electric field by the birefringence of the liquid crystal molecule so that the light is passing the region where the electric field is not formed, not the region where the electric field is formed (i.e., the region corresponding to the first electrode 176a).

In 3-dimensional display mode, when the voltage is applied to the switching liquid crystal panel 170 and the light scattering control unit 180, the light transmitting the light control film 160, the light scattering control unit 180, and the transmitting region of the switching liquid crystal panel 170 from the backlight 120 is transmitting the left eye pixels of the liquid crystal display panel 110 and then reaches to the left eye of the viewer. However, the light transmitting the left eye pixels of the liquid crystal display panel 110 and to be reached to the right eye of the viewer is blocked by the reflecting layer 168 of the light control film 160 and the electrode forming region of the switching liquid crystal panel 170 (i.e., region where the liquid crystal molecules are switched). That is, the light transmitting the left eye pixels of the liquid crystal display panel 110 does not reached to the right eye of the viewer.

Further, when the voltage is applied to the switching liquid crystal panel 170 and the light scattering control unit 180, the light transmitting the light control film 160, the light scattering control unit 180, and the transmitting region of the switching liquid crystal panel 170 from the backlight 120 is transmitting the right eye pixels of the liquid crystal display panel 110 and then reaches to the right eye of the viewer. However, the light transmitting the right eye pixels of the liquid crystal display panel 110 and to be reached to the left eye of the viewer is blocked by the reflecting layer 168 of the light control film 160 and the electrode forming region of the switching liquid crystal panel 170. That is, the light transmitting the right eye pixels of the liquid crystal display panel 110 does not reached to the left eye of the viewer.

As shown above, the light transmitting the right eye pixels reaches to only the right eye of the viewer and the light transmitting the left eye pixels reaches to only the left eye of the viewer. In these lights there is the sufficient parallax to be perceive by the viewer so that the viewer can perceive the 3-dimensional image.

In this embodiment, the light control film 160 is blocking the light incident to the light blocking region and transmitting the light transmitting the transmitting region to improve the efficient of the light, so that the brightness may be improved. In addition, since the light is blocked and transmitted by applying the voltage to the switching liquid crystal panel 170, the display device may be used as both 2 and 3-dimensional display devices.

The light scattering control unit 180 is able to switch the 2-dimensional mode and the 3-dimensional mode. In case where only the light scattering control unit 180 is provided to the present display device, not the switching liquid crystal panel 170, thus, it is possible to display both 2-dimensional image and 3-dimensional image. That is, when the voltage is not applied to the light scattering control unit 180, the 2-dimensional image may be realized. Further, when the voltage is applied to the light scattering control unit 180, the 3-dimensional image may be realized.

As described above, in this embodiment the 3-dimensional display device includes the switching liquid crystal panel 170 and the light scattering control unit 180 so that the 2-dimensional image and the 3-dimensional image can be displayed. Further, since the light control film 160 is provided in the present display device to reflect and focus the light from the backlight 120, the brightness can be improved.

However, this structure is shown only one example of the embodiment and the embodiment is not limited to this structure.

For example, the optical sheet may be disposed at the upper and lower sides of the light control film 160 to improve the efficient of the light.

Figure 3:
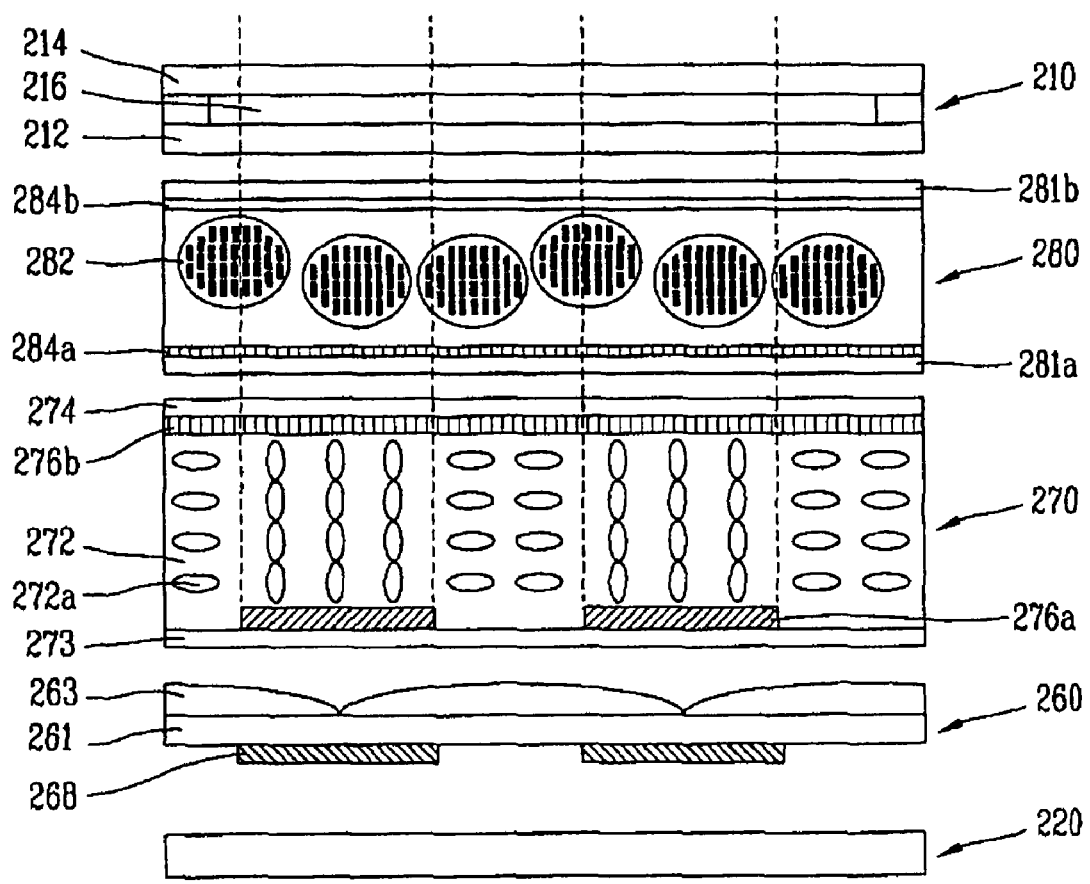
FIG. 3 is view showing a 3-dimensional display device according to another embodiment of the present invention.

As shown in FIG. 3, the light scattering control unit 280 and the switching liquid crystal panel 270 may be exchangeable installed to the 3-dimensional display device. That is, the switching liquid crystal panel 270 may be disposed over the light control film 260 and the light scattering control unit 280 may be disposed over the switching liquid crystal panel 270. In this structure, also, the light which is reflected and focused by the light control film 160 is incident to the switching liquid crystal panel 270. When the voltage is not applied to the switching liquid crystal panel 270, the light is transmitting the whole area of the switching liquid crystal panel 270 to display the 2-dimensional image. When the voltage is applied to the switching liquid crystal panel 270, the light is transmitting the predetermined region of the switching liquid crystal panel 270 to display 3-dimensional image.

As described above, the 2/3-dimensional display device according to the embodiment includes the light scattering control unit and the switching liquid crystal panel, so that both 2 and 3-dimensional images can be realized. Further, since the light from the backlight is reflected and focused, the efficiency of the light can be improved and as a result the brightness can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
    a display panel for displaying an image;
    a backlight for supplying light to the display panel;
    a switching liquid crystal panel for transmitting and blocking the light incident to the display panel in a part area;
    a light scattering control unit between the display panel and the backlight to scatter or transmit the light from the backlight, the light scattering control unit including a polymer dispersed liquid crystal layer, thereby the light from the backlight is scattered or transmitted in accordance with an arrangement of polymer dispersed liquid crystal of the polymer dispersed liquid crystal;
    a light control film between the backlight and the light scattering control unit to reflect and focus the light from the backlight, the light control film including:
        a substrate having two opposite surfaces, one surface facing the light scattering control unit and other surface facing the backlight;
        a lens on one surface of the substrate to focus the light; and
        a reflecting layer on other surface of the substrate at a boundary region of the lens to reflect the light incident from the backlight in the backlight,
    wherein the lens and the reflecting layer formed respectively on the opposite surfaces of the substrate,
        wherein the switching liquid crystal panel is disposed between the liquid crystal display panel and the light scattering control unit so that the light scattered from the light scattering control unit or the light focused at the lens of the light control film is passed thereto,
        wherein the switching liquid crystal panel is disposed between the display panel and the light scattering control unit, the switching liquid crystal panel including first substrate facing the light scattering control unit and second substrate facing the display panel, a liquid crystal layer between the first and second substrate, and patterned first electrode on a part of the first substrate and a second electrode on the second substrate to apply the voltage to the liquid crystal layer so that the light from the light scattering control unit is incident to the switching liquid crystal panel through the first substrate including the patterned first electrode.

2. The device of claim 1, wherein the display panel includes a liquid crystal display panel.

3. The device of claim 1, wherein the display panel includes a plurality of left eye pixels and right eye pixels alternatively arranged.

4. The device of claim 1, wherein the light scattering control unit includes:
    substrates facing each other, the light scattering control unit being sandwiched by the substrates; and
    electrodes on the substrates to apply voltage to the polymer dispersed liquid crystal layer.

5. The device of claim 4, wherein the light scattering control unit scatters the light incident through the light control film to display the 2-dimensional image when the voltage is not applied to the electrodes.

6. The device of claim 4, wherein the light scattering control unit transmits the light incident through the light control film to display the 3-dimensional image when the voltage is applied to the electrodes.

7. The device of claim 1, wherein the lens includes a convex lens.

8. The device of claim 1, wherein the reflecting layer is made of a metal.

9. The device of claim 1, wherein the back light includes:
    a lamp for emitting the light; and
    a reflecting plate for reflecting the light from the lamp to the display panel.

10. The device of claim 9, wherein the reflecting plate re-reflects the light reflected by the reflecting layer of the light control film.

11. The device of claim 1, wherein the switching liquid crystal panel includes:
    first and second substrate;
    a liquid crystal layer between the first and second substrate; and
    first electrode on a part of the first substrate and a second electrode on the second substrate to apply the voltage to the liquid crystal layer.

12. The device of claim 11, wherein all the liquid crystal molecules are arranged in the uniform direction to transmit uniformly the light when the voltage is not applied to the first and second electrodes.

13. The device of claim 11, wherein the liquid crystal molecules in region where the electric field is formed are switched by the electric field to block the light to the region when the voltage is applied to the first and second electrodes.

14. A display device comprising:
- a display panel for displaying an image;
- a backlight for supplying light to the display panel;
- a switching liquid crystal panel for transmitting and blocking the light incident to the display panel in a part area
- a light scattering control unit between the display panel and the backlight to scatter or transmit the light from the backlight, the light scattering control unit including a polymer dispersed liquid crystal layer, thereby the light from the backlight is scattered or transmitted in accordance with an arrangement of polymer dispersed liquid crystal of the polymer dispersed liquid crystal;
- a light control film between the backlight and the light scattering control unit to reflect and focus the light from the backlight, the light control film including:
- a substrate having two opposite surfaces, one surface facing the light scattering control unit and other surface facing the backlight;
- a lens on one surface of the substrate to focus the light; and
- a reflecting layer on other surface of the substrate at a boundary region of the lens to reflect the light incident from the backlight in the backlight,
- wherein the lens and the reflecting layer formed respectively on the opposite surfaces of the substrate,
- wherein the switching liquid crystal panel is disposed between the light scattering control unit and the light control film so that the light focused at the lens of the light control film is passed thereto,
- wherein the switching liquid crystal panel is disposed between the display panel and the light scattering control unit, the switching liquid crystal panel including first substrate facing the light scattering control unit and second substrate facing the display panel, a liquid crystal layer between the first and second substrate, and patterned first electrode on a part of the first substrate and a second electrode on the second substrate to apply the voltage to the liquid crystal layer so that the light from the light scattering control unit is incident to the switching liquid crystal panel through the first substrate including the patterned first electrode.

15. The device of claim 14, wherein the display panel includes a liquid crystal display panel.

16. The device of claim 14, wherein the display panel includes a plurality of left eye pixels and right eye pixels alternatively arranged.

17. The device of claim 14, wherein the light scattering control unit includes:
- substrates facing each other, the light scattering control unit being sandwiched by the substrates; and
- electrodes on the substrates to apply voltage to the polymer dispersed liquid crystal layer.

18. The device of claim 14, wherein the lens includes a convex lens.

19. The device of claim 14, wherein the reflecting layer is made of a metal.

20. The device of claim 14, wherein the back light includes:
- a lamp for emitting the light; and
- a reflecting plate for reflecting the light from the lamp to the display panel.

21. The device of claim 14, wherein the switching liquid crystal panel includes:
- first and second substrate;
- a liquid crystal layer between the first and second substrate; and
- first electrode on a part of the first substrate and a second electrode on the second substrate to apply the voltage to the liquid crystal layer.

* * * * *